United States Patent
Leo et al.

(10) Patent No.: US 10,710,377 B2
(45) Date of Patent: Jul. 14, 2020

(54) SYSTEM AND METHOD FOR PRODUCING AN IMAGE ON AN ARTICLE

(71) Applicant: Xerox Corporation, Norwalk, CT (US)

(72) Inventors: Michael F. Leo, Penfield, NY (US); Brendan C. Casey, Webster, NY (US); Wayne A. Buchar, Bloomfield, NY (US); Daniel J. McVeigh, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/220,781

(22) Filed: Dec. 14, 2018

(65) Prior Publication Data

US 2019/0134993 A1 May 9, 2019

Related U.S. Application Data

(63) Continuation-in-part of application No. 15/945,367, filed on Apr. 4, 2018.

(60) Provisional application No. 62/562,116, filed on Sep. 22, 2017.

(51) Int. Cl.
| | |
|---|---|
| *B41J 3/407* | (2006.01) |
| *B41J 11/00* | (2006.01) |
| *B41F 13/004* | (2006.01) |
| *G03G 15/22* | (2006.01) |
| *B41J 29/38* | (2006.01) |
| *B41J 29/02* | (2006.01) |
| *H04N 1/00* | (2006.01) |

(52) U.S. Cl.
CPC ......... *B41J 3/4073* (2013.01); *B41F 13/0045* (2013.01); *B41J 11/002* (2013.01); *B41J 29/02* (2013.01); *B41J 29/38* (2013.01); *G03G 15/224* (2013.01); *H04N 1/0019* (2013.01)

(58) Field of Classification Search
CPC .............................. B41J 3/4073; B41J 11/002
See application file for complete search history.

(56) References Cited

U.S. PATENT DOCUMENTS

| | | | | |
|---|---|---|---|---|
| 4,392,565 | A * | 7/1983 | Strauch | B41F 17/22 101/38.1 |
| 2012/0098914 | A1* | 4/2012 | Dubuit | B41J 3/4073 347/104 |
| 2013/0176358 | A1* | 7/2013 | Yamada | B41M 1/04 347/20 |

(Continued)

*Primary Examiner* — Alessandro V Amari
*Assistant Examiner* — Kendrick X Liu
(74) *Attorney, Agent, or Firm* — Maginot Moore & Beck LLP

(57) ABSTRACT

A system prints solid ink images on fibrous objects. The controller of the system is configured to operate a first motor to move an object rotating subsystem to and from a position opposite a plurality of printheads, to operate a second motor to rotate an object on a spindle of the object rotating subsystem at the position opposite the plurality of printheads, to operate a forced air heater to direct heated air onto a surface of the object as the object rotates at the position opposite the plurality of printheads, and to operate the plurality of printheads to eject a solid ink marking material onto the heated surface of the object as the object rotates in the first and/or second rotational direction. The solid ink image is affixed to the object by the heating of the object surface alone.

14 Claims, 20 Drawing Sheets

(56) References Cited

U.S. PATENT DOCUMENTS

2015/0040701 A1* 2/2015 Shimomura ........ F16H 25/2219
  74/89.23
2017/0001450 A1* 1/2017 Koers .................... B41J 3/4073
2017/0100898 A1* 4/2017 Cofler ................... B33Y 10/00

* cited by examiner

SYSTEM AND METHOD FOR PRODUCING AN IMAGE ON AN ARTICLE

CLAIM OF PRIORITY TO APPLICATIONS

This patent application is a continuation-in-part application of and claims priority to U.S. patent application Ser. No. 15/945,367, which is entitled "System And Method For Producing An Image On An Article" and was filed on Apr. 4, 2018, which claims the benefit under 35 U.S.C. § 119(e) of U.S. Provisional Patent Application No. 62/562,116, which is entitled "System And Method For Producing An Image On An Article" and was filed Sep. 22, 2017, which application is incorporated herein by reference.

TECHNICAL FIELD

The presently disclosed embodiments are directed to a printing system that prints images directly on three-dimensional (3D) objects, and more particularly, to a system for printing directly on containers made of fibrous material, such as paper.

BACKGROUND

Commercial article printing typically occurs during the production of the article. For example, ball skins are printed with patterns or logos prior to the ball being completed and inflated. Consequently, retail locations in regions where potential product customers support multiple professional or collegiate teams need to keep an inventory of products bearing the logos of various teams followed in that area. Ordering the correct number of products for each different logo to maintain sufficient inventory can be problematic and expensive.

One way to address these issues in non-production outlets would be to keep unprinted versions of the products and print the patterns or logos on them at the distribution site, i.e., on-demand. Printers known as direct-to-object (DTO) printers have been developed for printing on individual objects. However, these DTO printers typically employ printing techniques similar to two-dimensional (2D) flatbed printers, i.e., printheads that traverse the width of a print media close to the surface of the print media. Due to the proximity of the traversing printheads, these printers are limited to printing on surfaces that are relatively flat, i.e., with no protrusions. Therefore, adapting known printing techniques, such as 2D media printing technology, to apply image content onto three-dimensional objects with non-uniform surfaces is difficult. The difficulties are especially compounded when the objects are non-uniform in diameter, or contain large protrusions, e.g., the satellite rings or lip for attaching a lid on a bucket.

Thus, a DTO printer to print on three-dimensional, e.g., frustoconical objects, having a non-uniform surface is needed. The present disclosure addresses a system and method printing high quality images on three-dimensional objects, e.g., on a frustoconical surface such as a bucket, such that image integrity is maintained.

SUMMARY

According to aspects illustrated herein, there is provided a system for printing images on an object, the system including, a housing, a rod driven by a first motor, an object rotating subsystem positioned about the rod and arranged for reciprocal movement, the object rotating subsystem includes a spindle and a second motor connected to the spindle and configured to rotate the object in a first rotational direction or a second rotational direction, opposite the first rotational direction. The system further including a vacuum source connected to the spindle, a plurality of printheads, a curing lamp, and a controller operatively connected to the plurality of printheads, the first motor, the second motor, and the curing lamp. The controller is configured to operate the first motor, the second motor, the plurality of printheads, and the curing lamp, wherein the plurality of printheads are configured to eject a first marking material onto the object and the second motor rotates the object in the first or second rotational direction.

According to other aspects illustrated herein, there is provided a method of printing an image onto an object including the steps of creating a negative pressure with a vacuum source operatively connected to a spindle; securing the object to a carrier, operatively arranged to rotate in a first rotational direction and a second rotational direction opposite the first rotational direction; rotating the object with a first motor in the first rotational direction a first rotational distance; sensing with at least one optical sensor a location of a first protrusion on an external surface of the object while the object is rotating; stopping the rotation of the object in the first rotational direction; rotating the object with the first motor in the second direction a second rotational distance, the second rotational distance is based on the location of the first protrusion; displacing a printhead carrier with a second motor to a first position determined by the location of the first protrusion; and printing an image onto the external surface of the object with a plurality of printheads arranged on the printhead carrier.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

Figure 1:
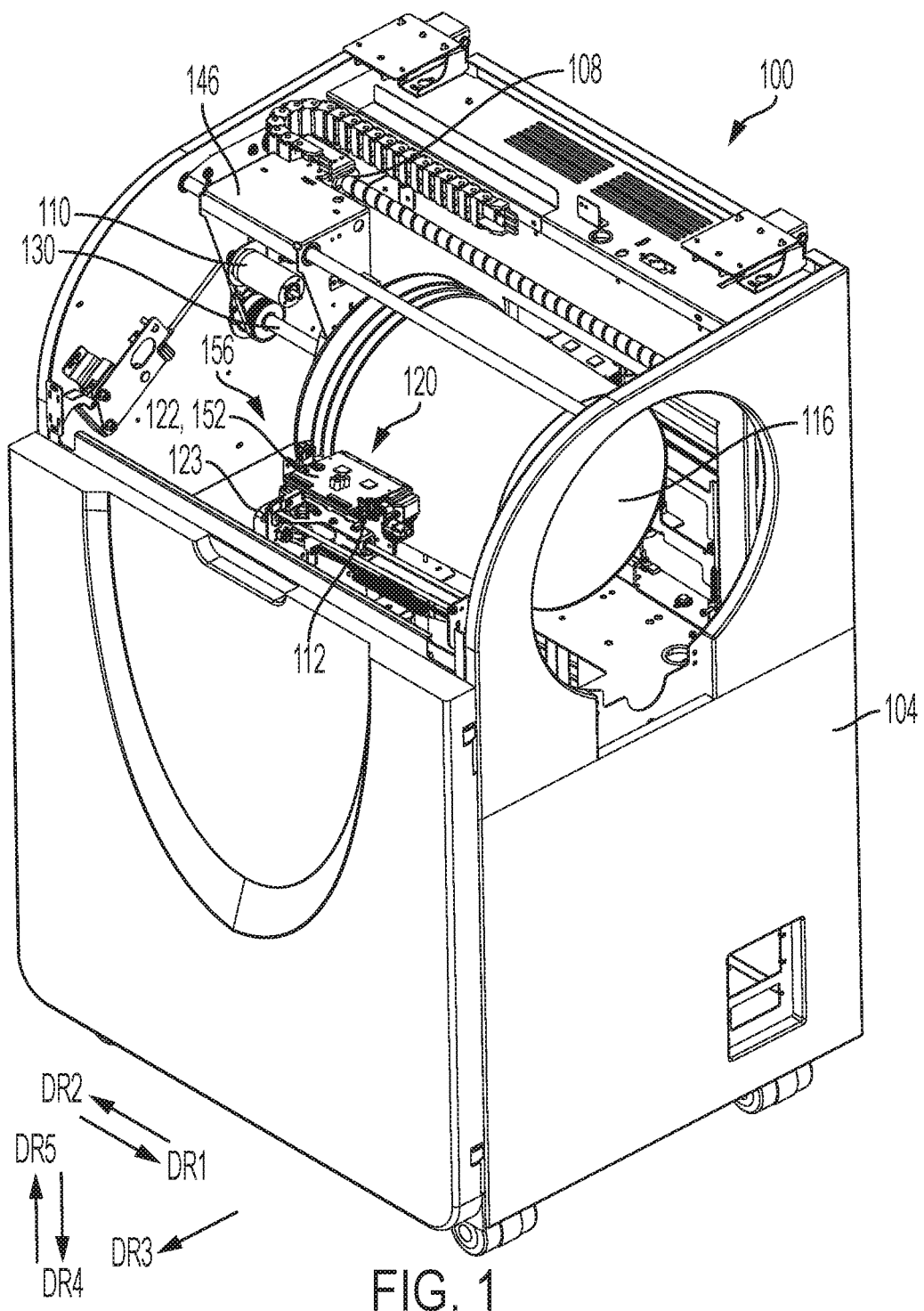
FIG. 1 is a front perspective view of an embodiment of a printer system disclosed herein.
Figure 2:
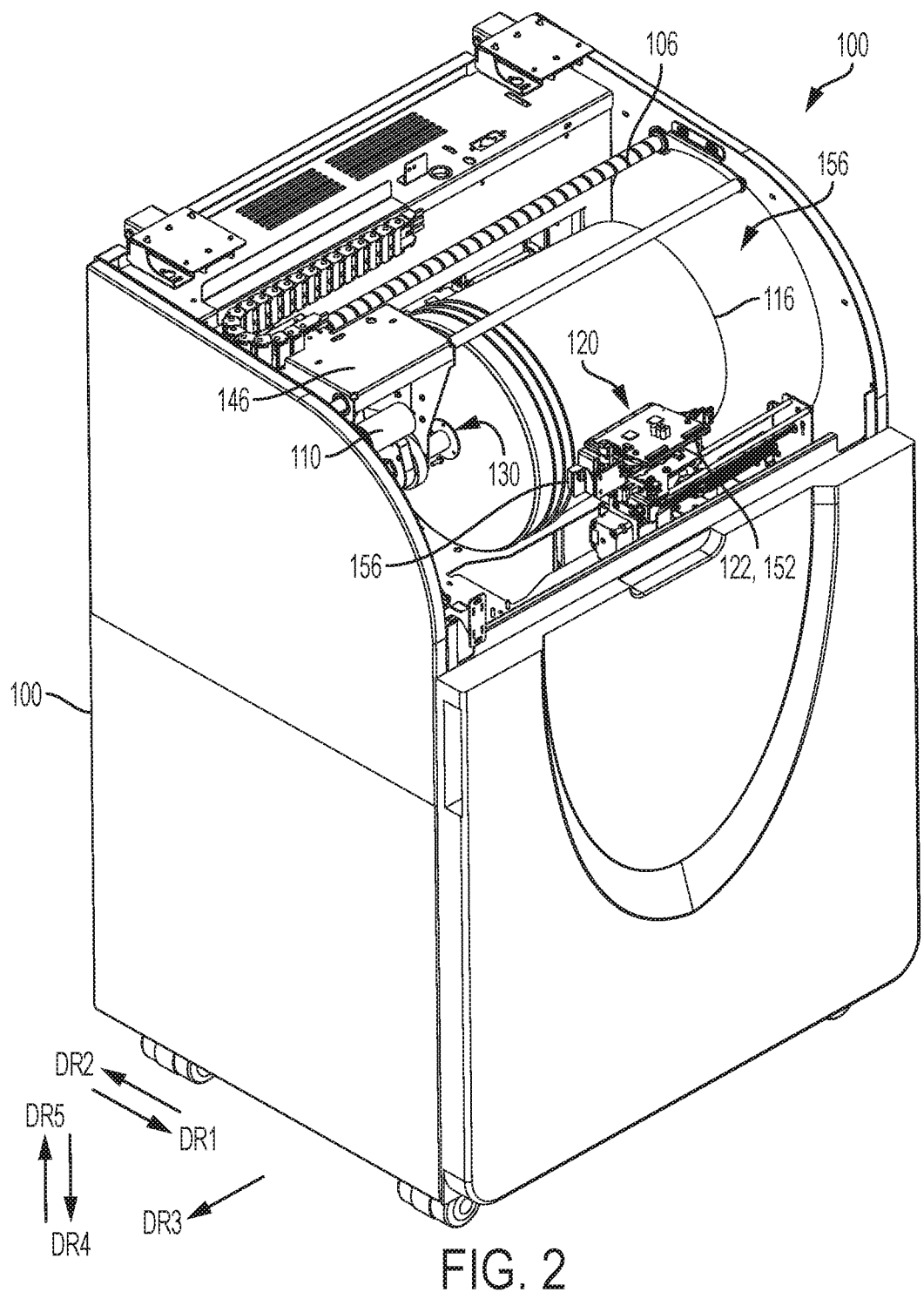
FIG. 2 is a front perspective view of an embodiment of a printer system disclosed herein.
Figure 3:
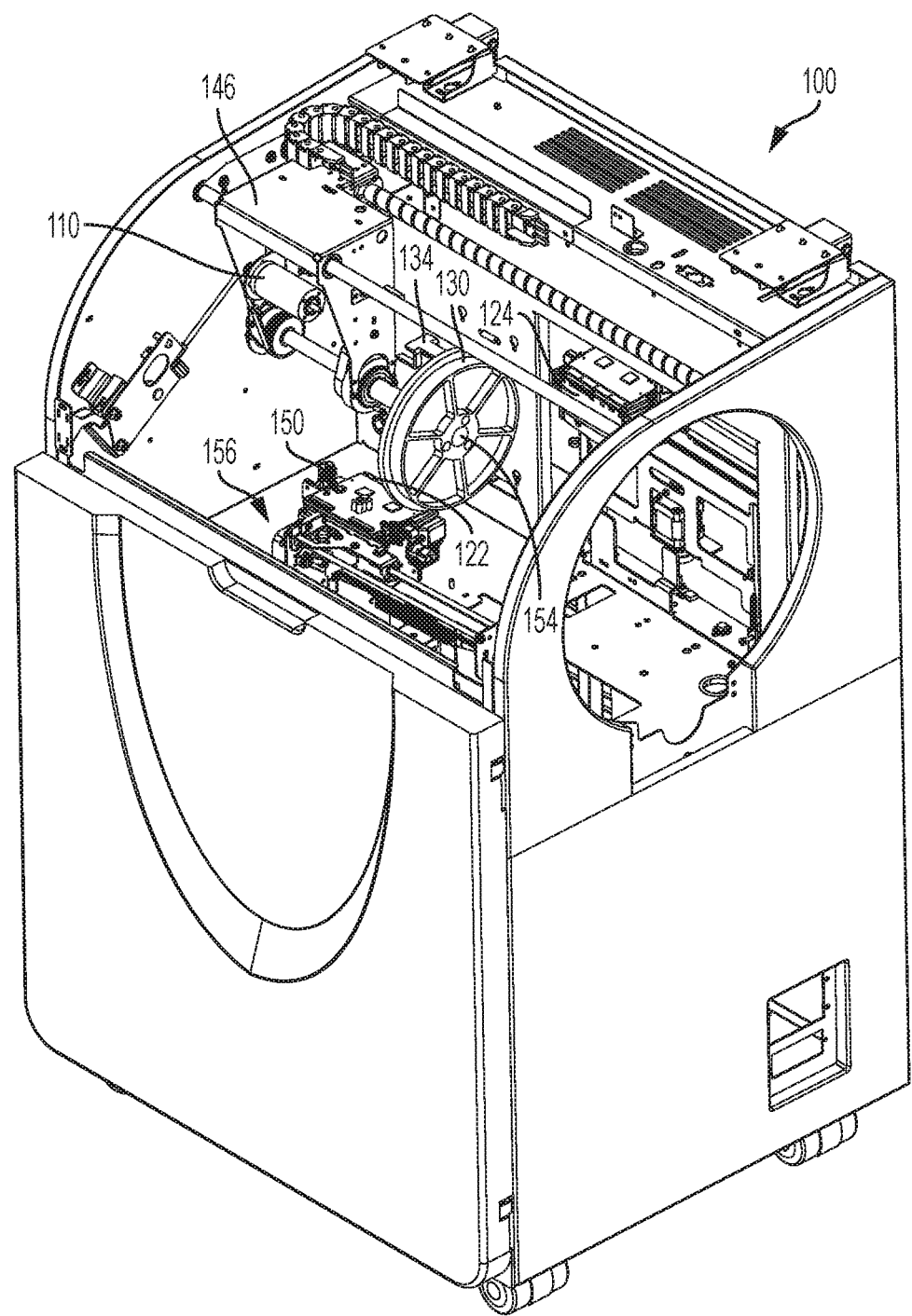
FIG. 3 is a front perspective view of an embodiment of a printer system disclosed herein without a conical object therein.
Figure 4:
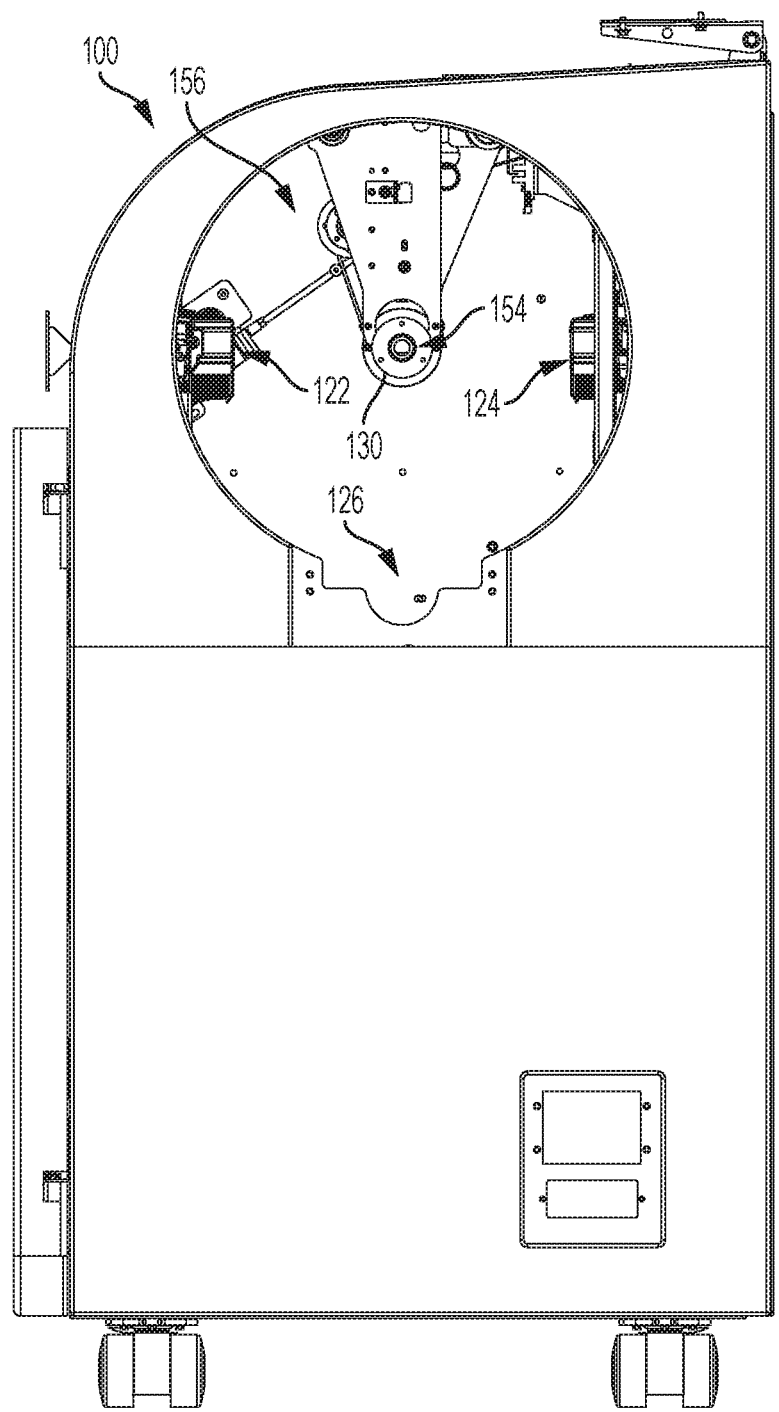
FIG. 4 is a right-side elevational view of an embodiment of a printer system disclosed herein without a conical object.
Figure 5:
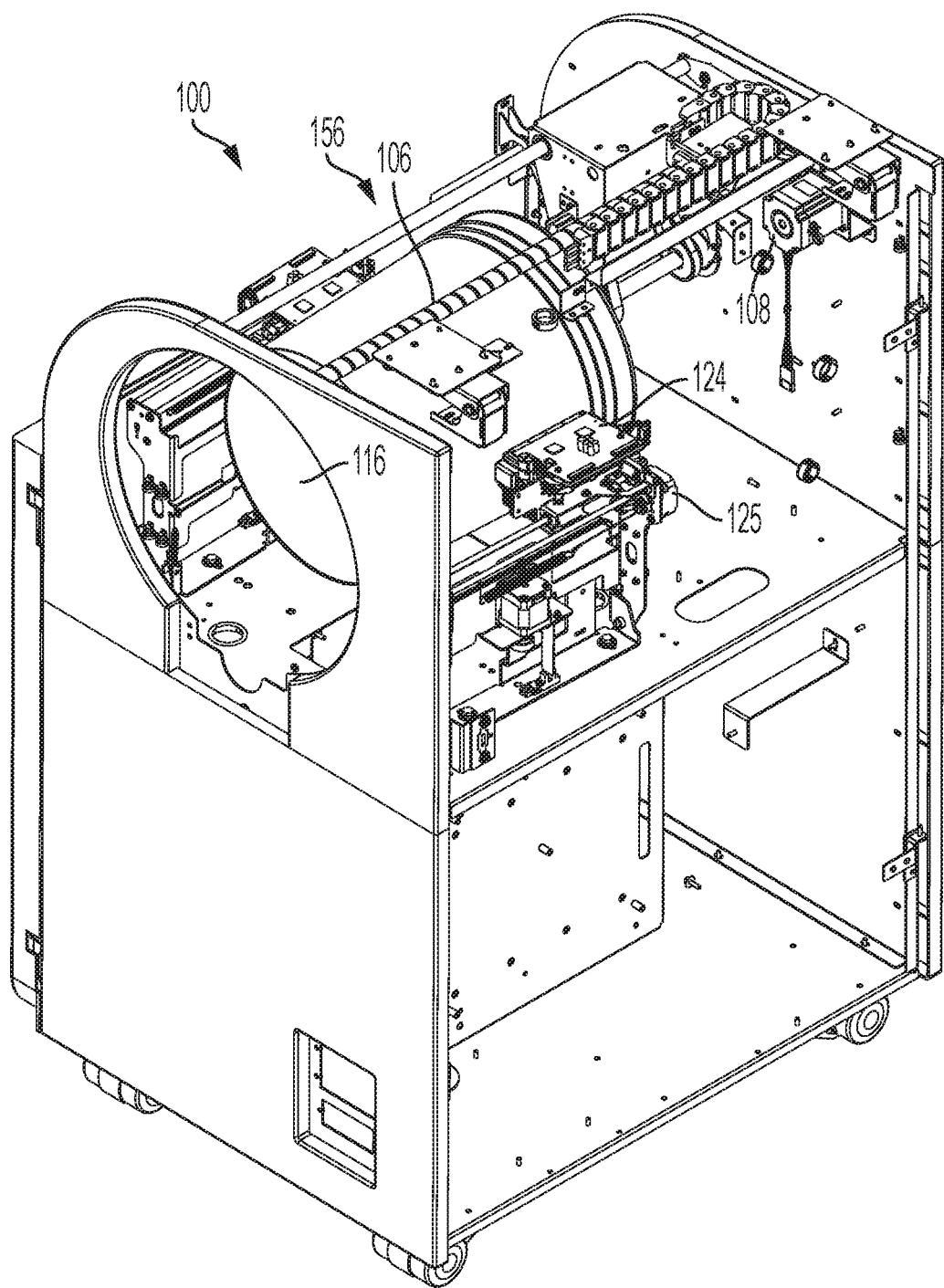
FIG. 5 is a rear perspective view of an embodiment of a printer system disclosed herein.
Figure 6:
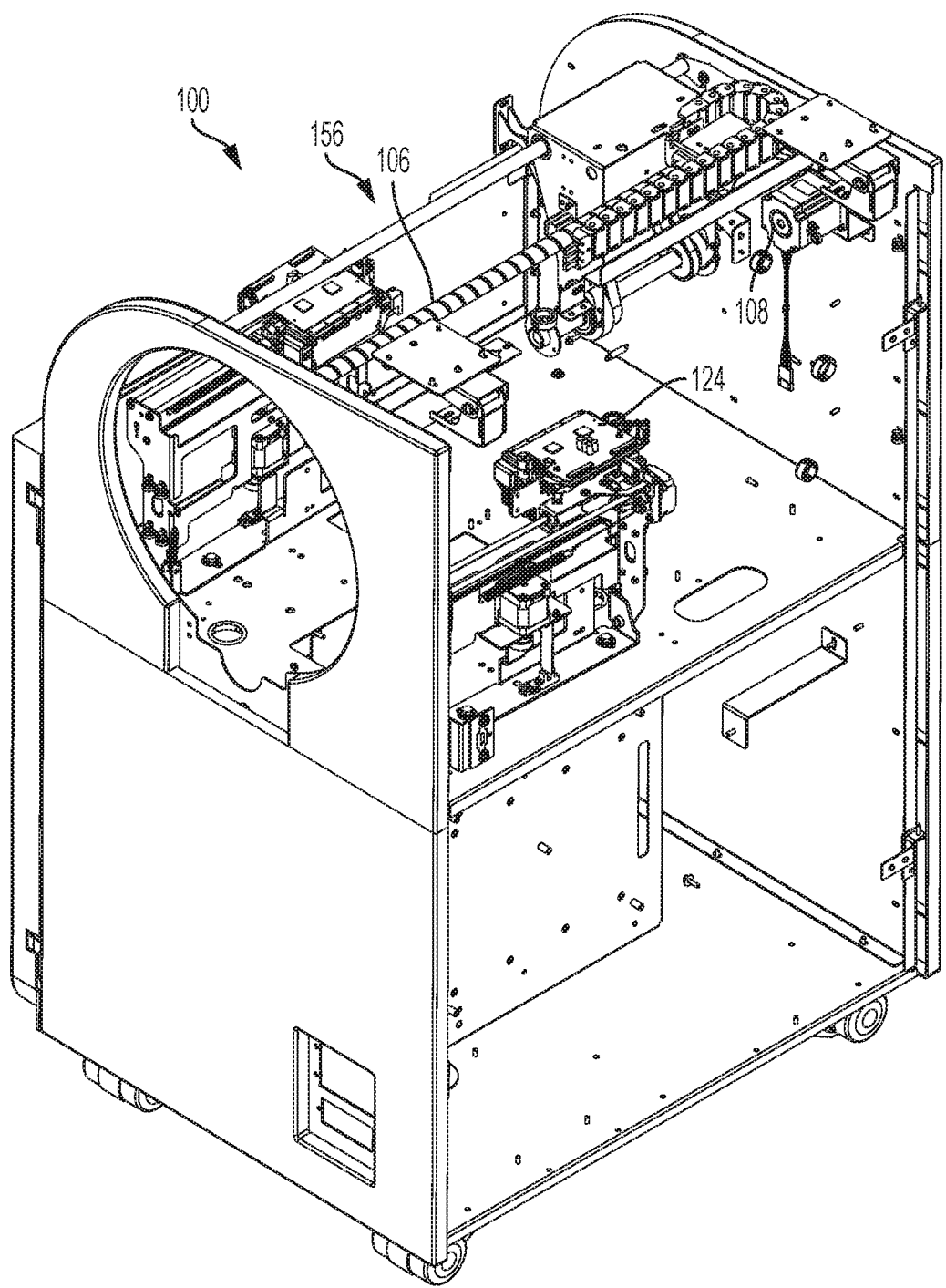
FIG. 6 is a rear perspective view of an embodiment of a printer system disclosed herein without a conical object.
Figure 7:
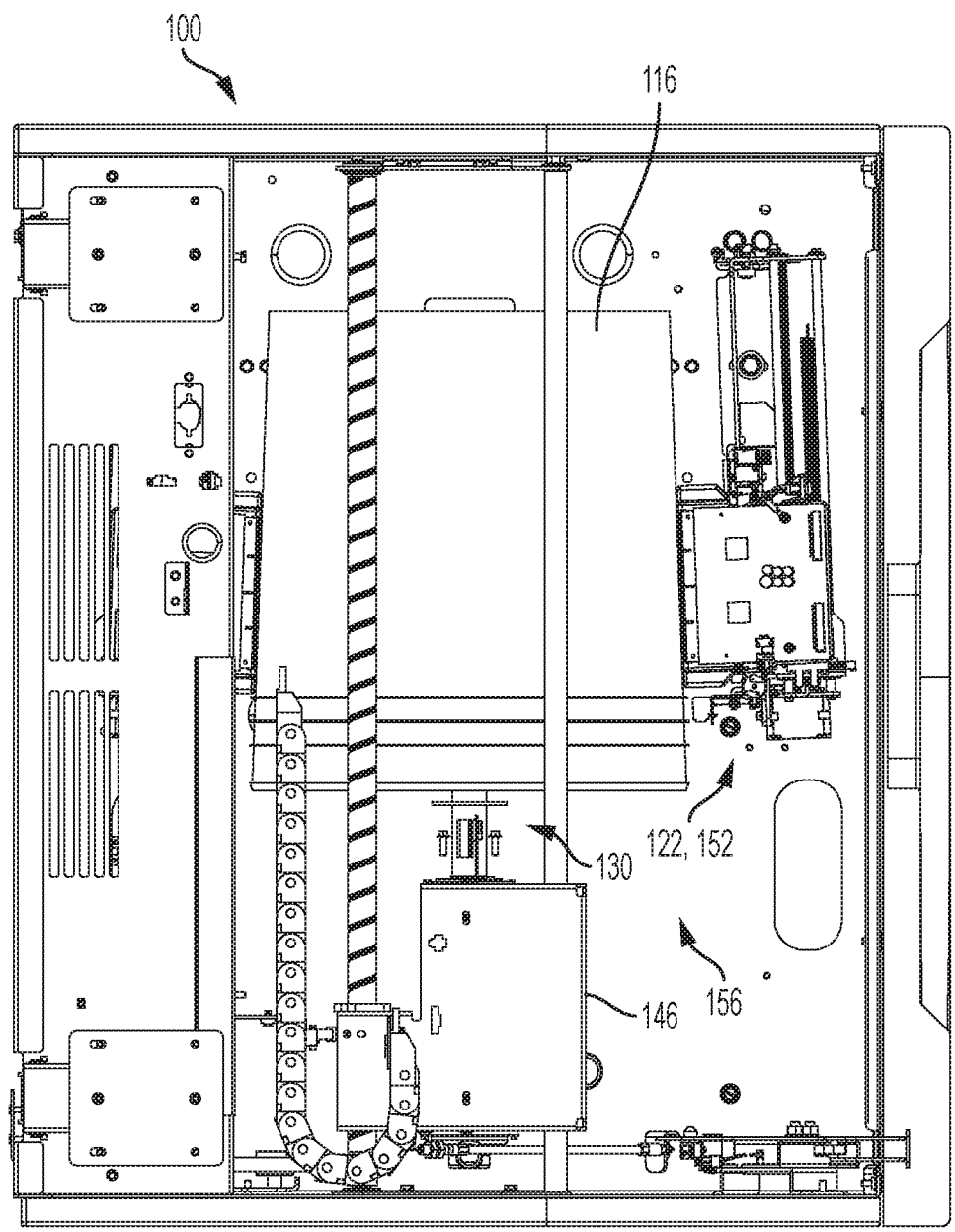
FIG. 7 is a top plan view of an embodiment of a printer system disclosed herein.
Figure 8:
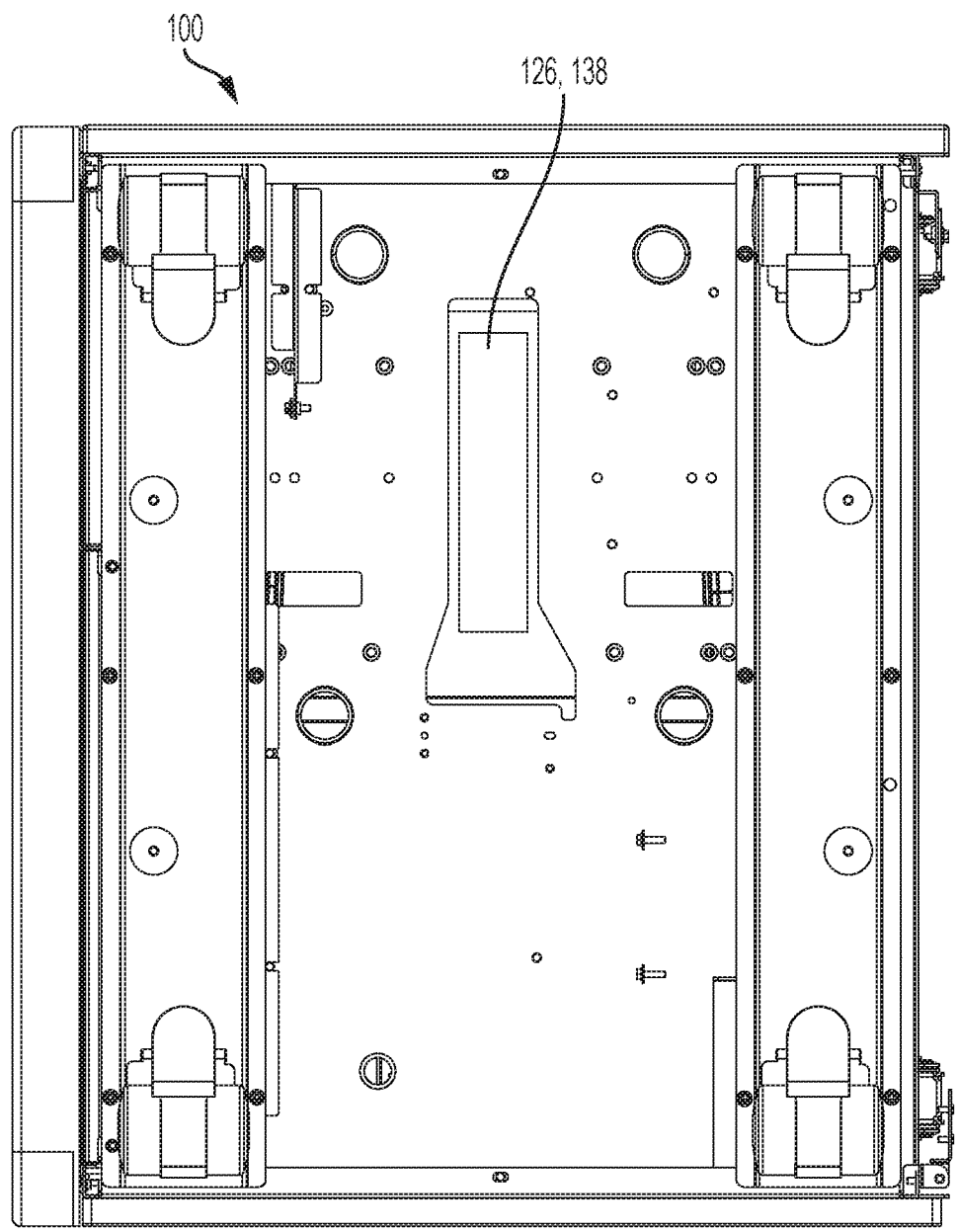
FIG. 8 is a bottom plan view of an embodiment of a printer system disclosed herein.
Figure 9:
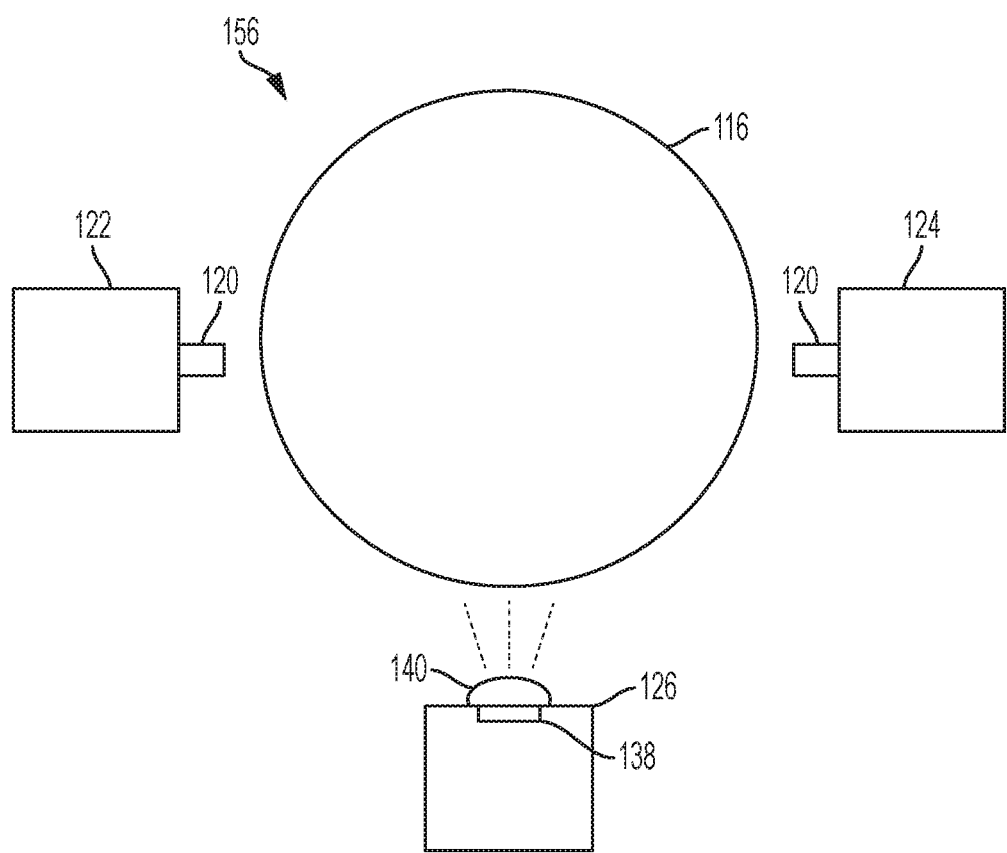
FIG. 9 is a schematic view of a portion of an embodiment of a printer system disclosed herein including a plurality of printheads and curing device arranged about a conical object.
Figure 10:
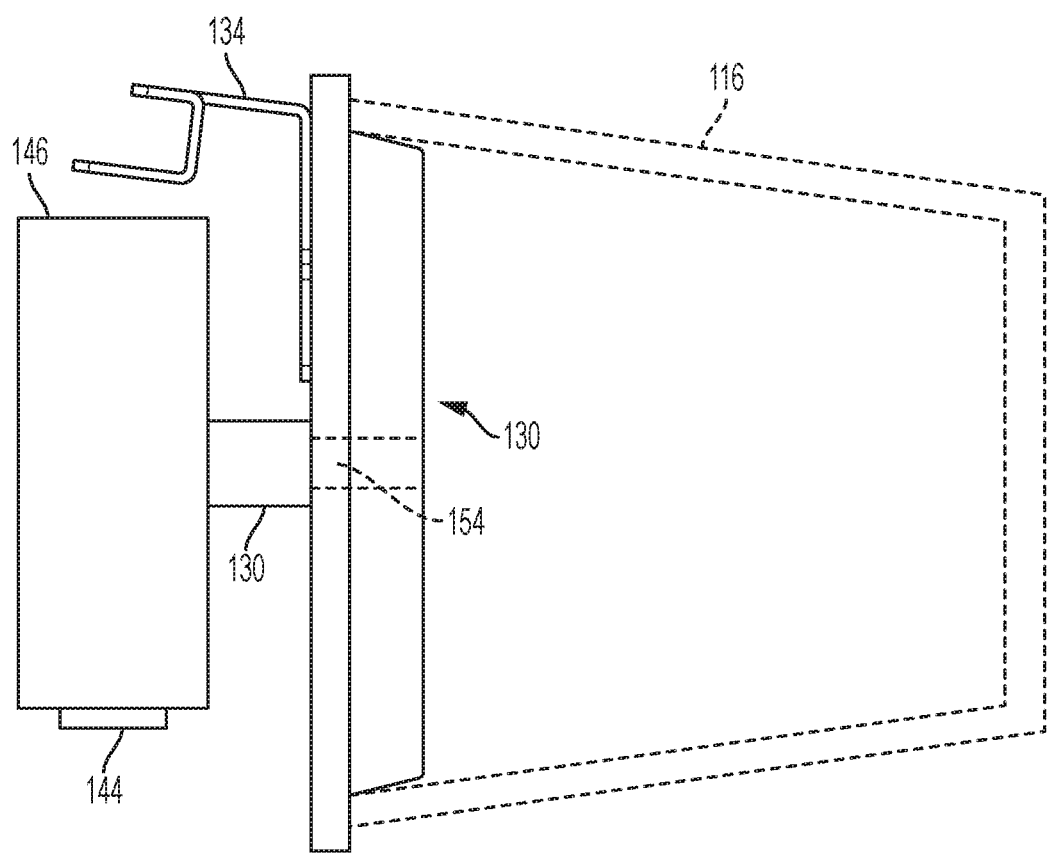
FIG. 10 is a schematic view of a spindle of an embodiment of a printer system disclosed herein having a conical object arranged thereon and depicted in broken lines.
Figure 11:
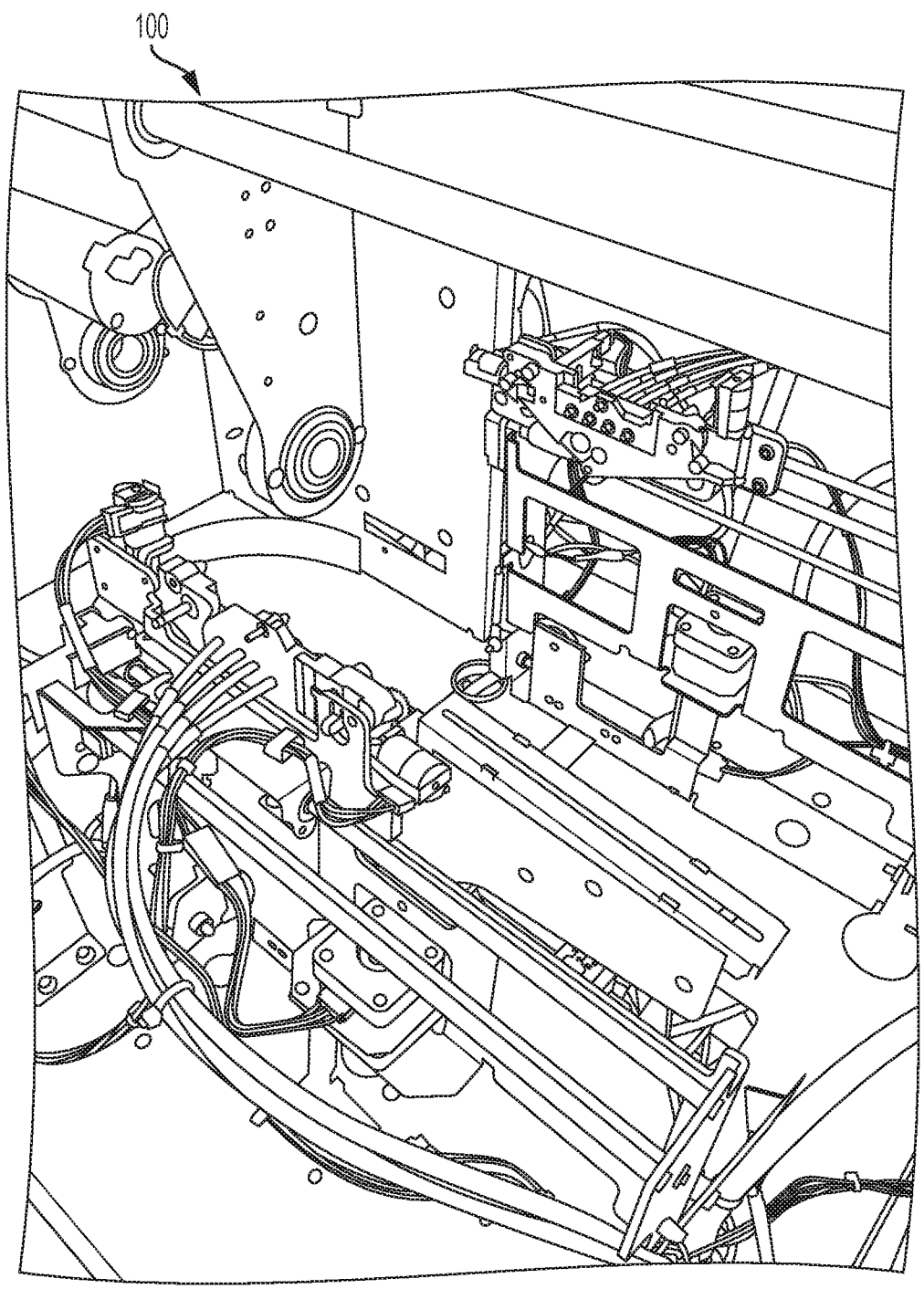
FIG. 11 is a front perspective view of the various internal mechanisms of an embodiment of a printer system disclosed herein including oppositely disposed printhead arrangements.
Figure 12:
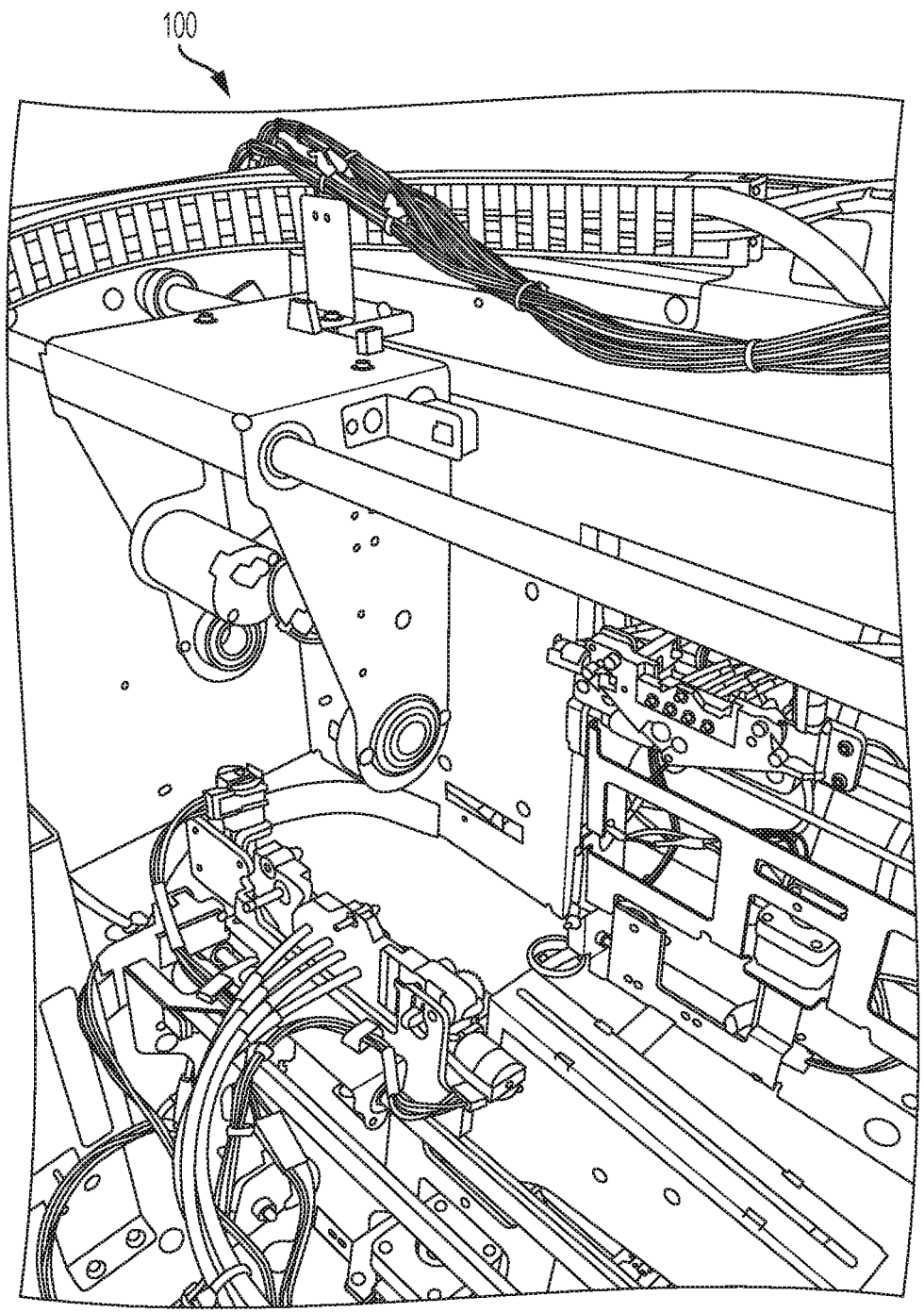
FIG. 12 is a front perspective view of the various internal mechanisms of an embodiment of a printer system disclosed herein including oppositely disposed printhead arrangements.
Figure 13:
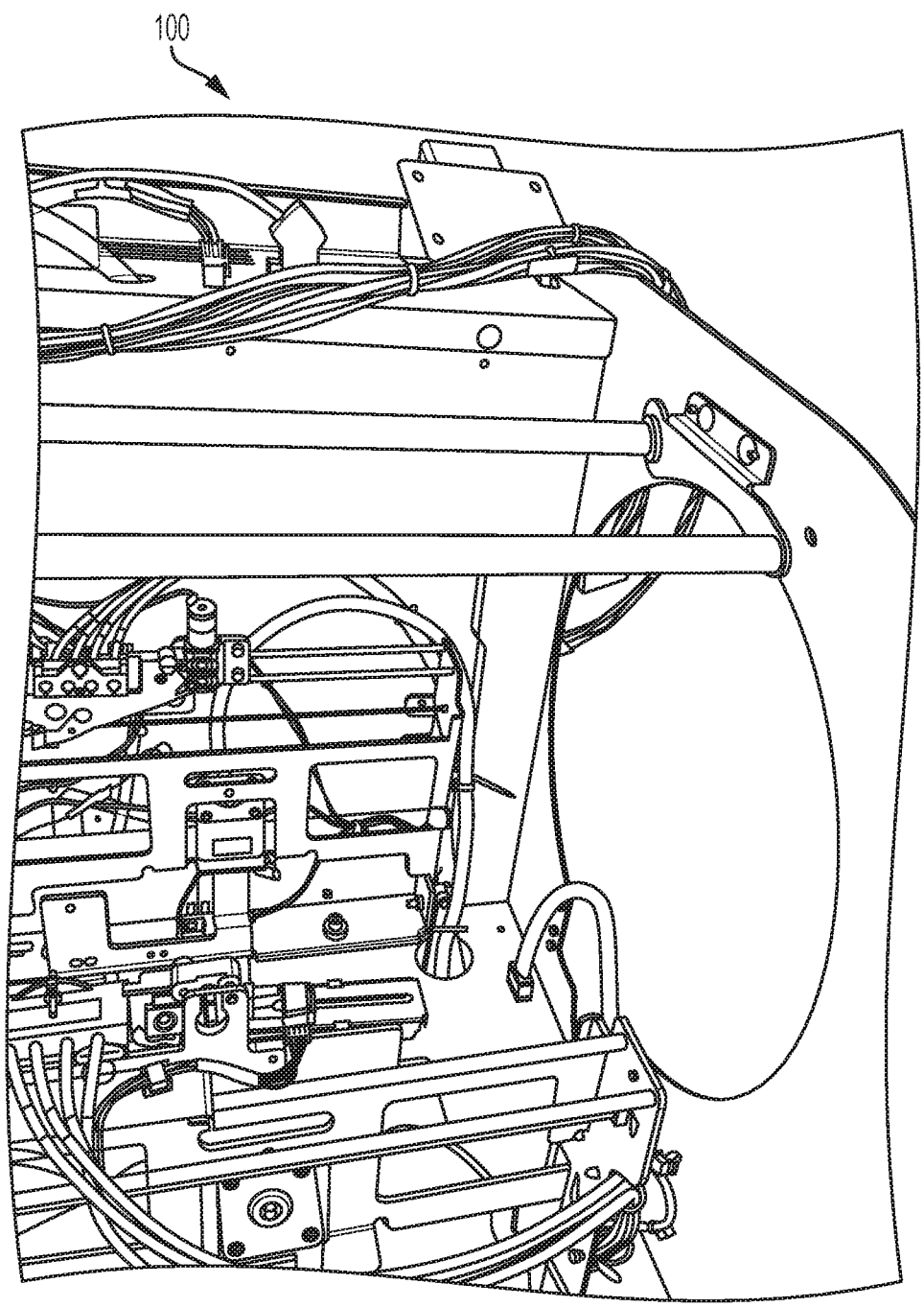
FIG. 13 is a front perspective view of the various internal mechanisms of an embodiment of a printer system disclosed herein including an opening for insertion of an object to be printed upon.
Figure 14:
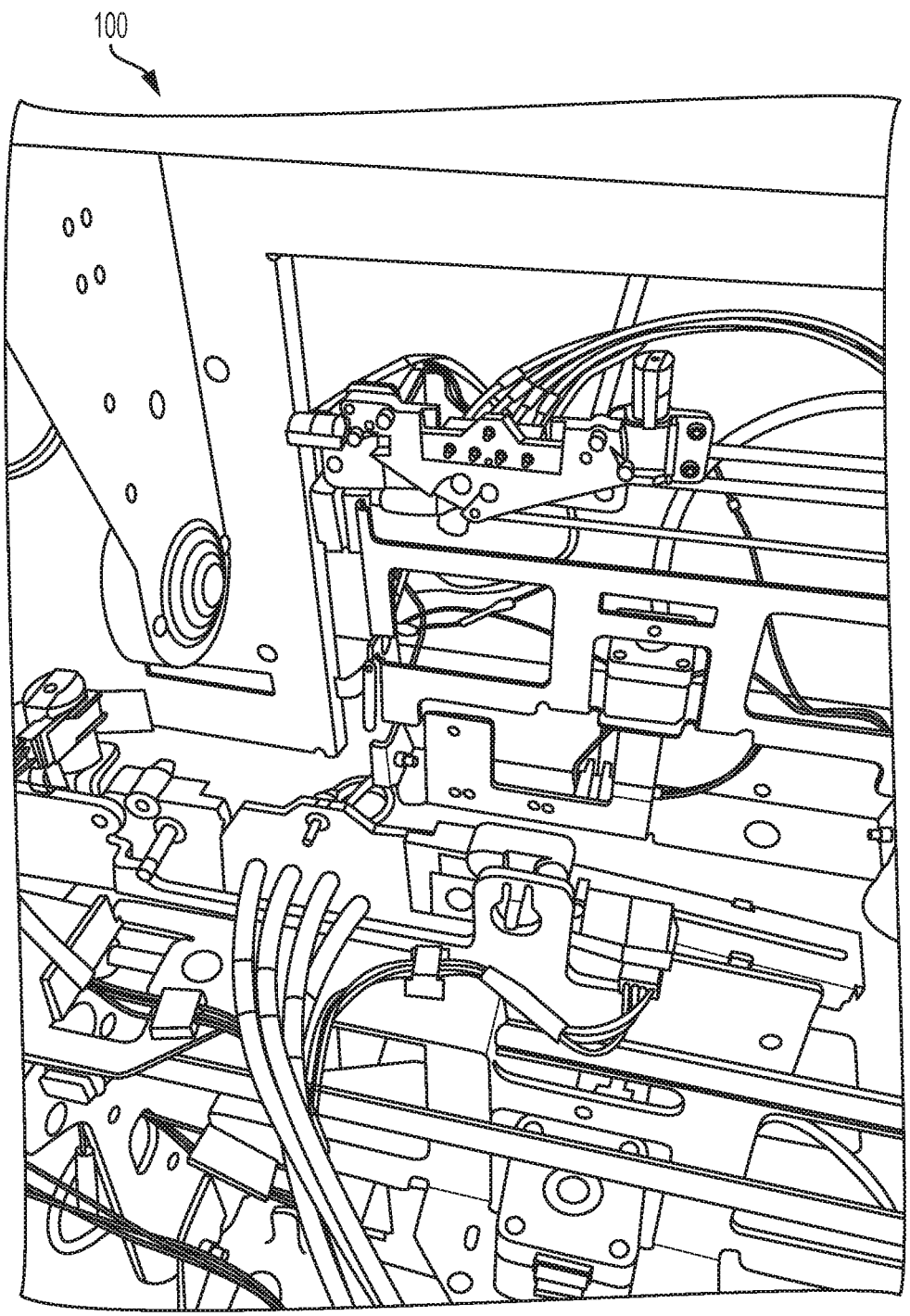
FIG. 14 is a front perspective view of the various internal mechanisms of an embodiment of a printer system disclosed herein including oppositely disposed printhead arrangements.
Figure 15:
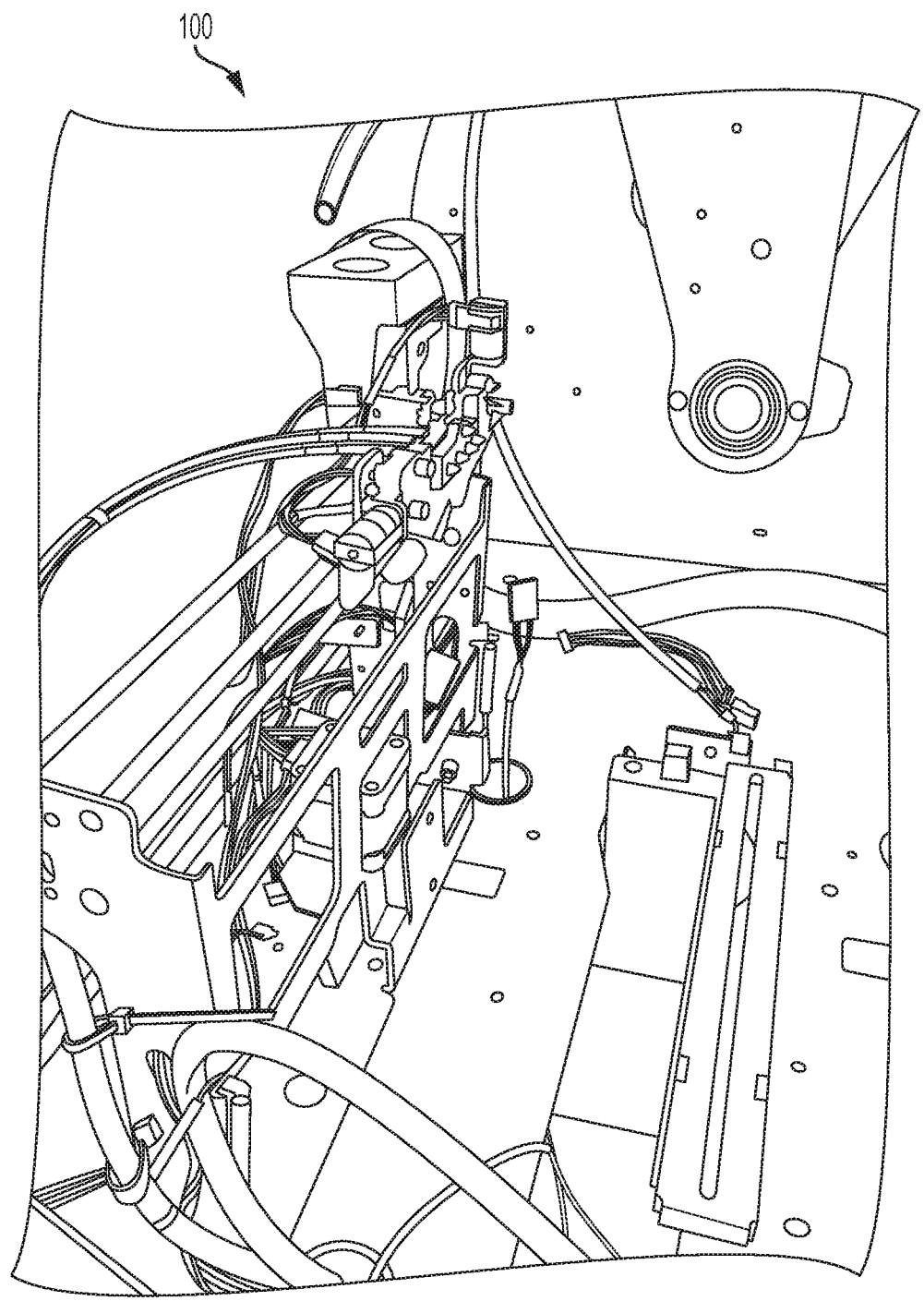
FIG. 15 is a side perspective view of the various internal mechanisms of an embodiment of a printer system disclosed herein including a printhead.
Figure 16:
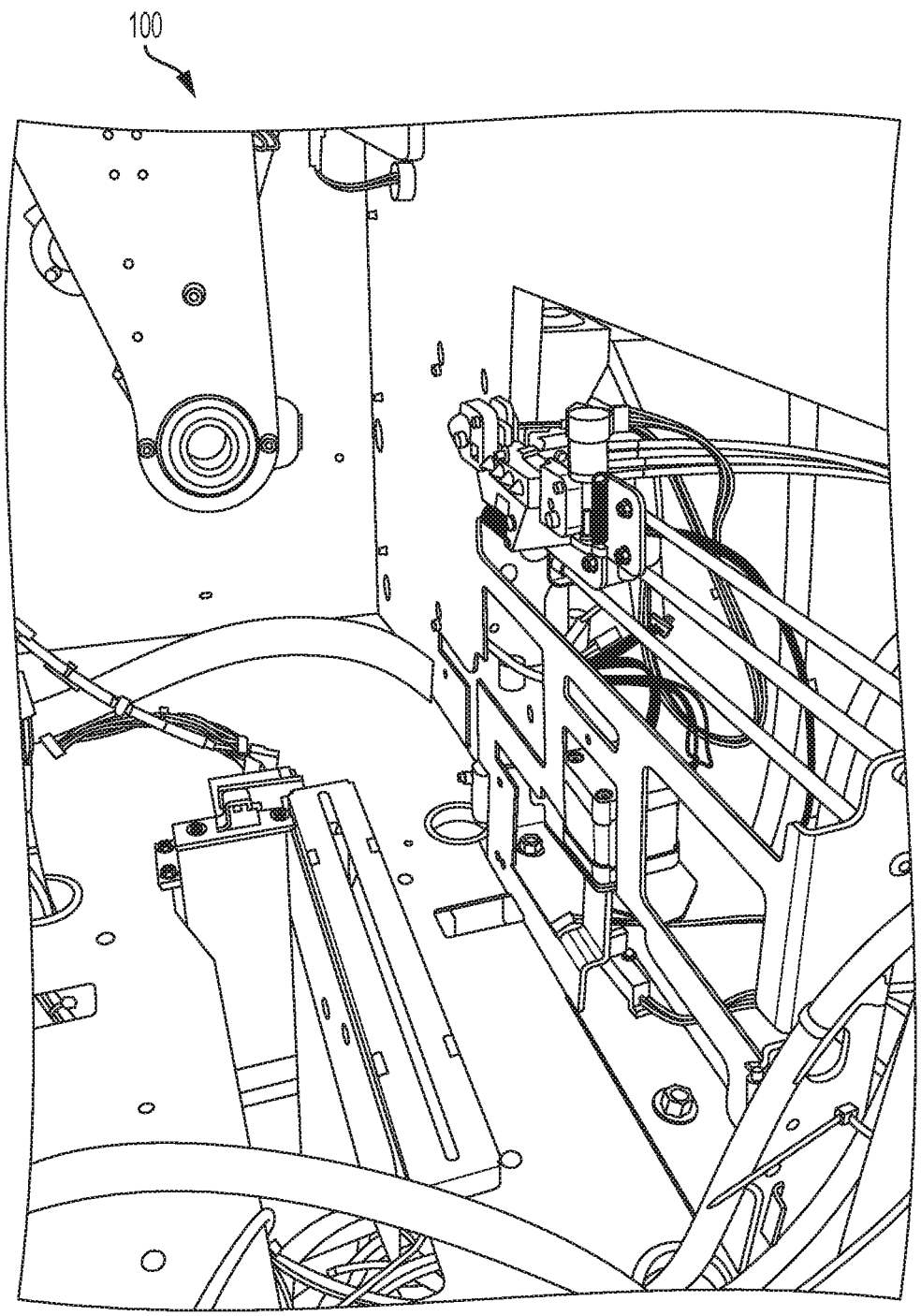
FIG. 16 is a side perspective view of the various internal mechanisms of an embodiment of a printer system disclosed herein including a printhead oppositely disposed from the printhead depicted in FIG. 15.
Figure 17:
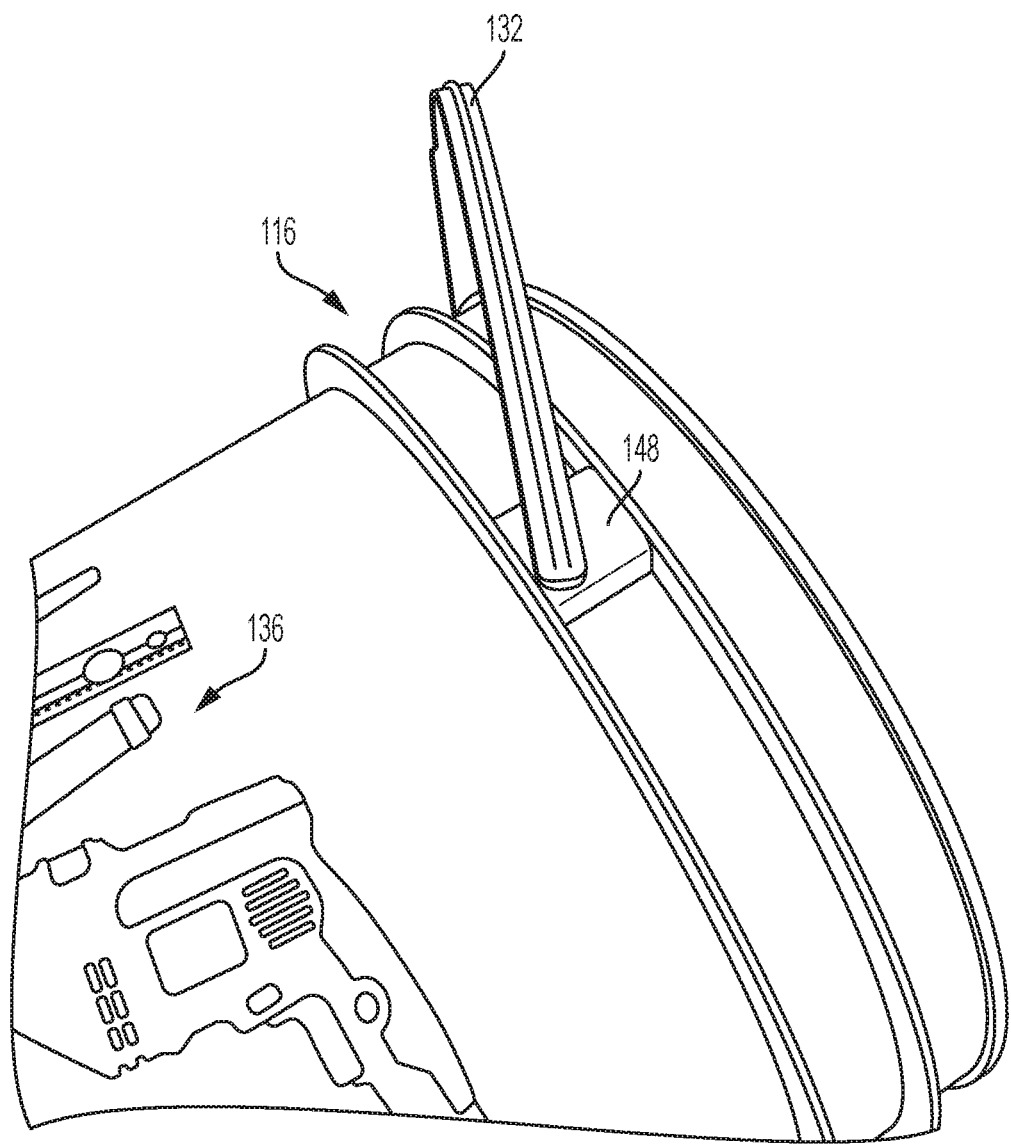
FIG. 17 is a side perspective view of a conical object used with an embodiment of a printer system disclosed herein.
Figure 18:
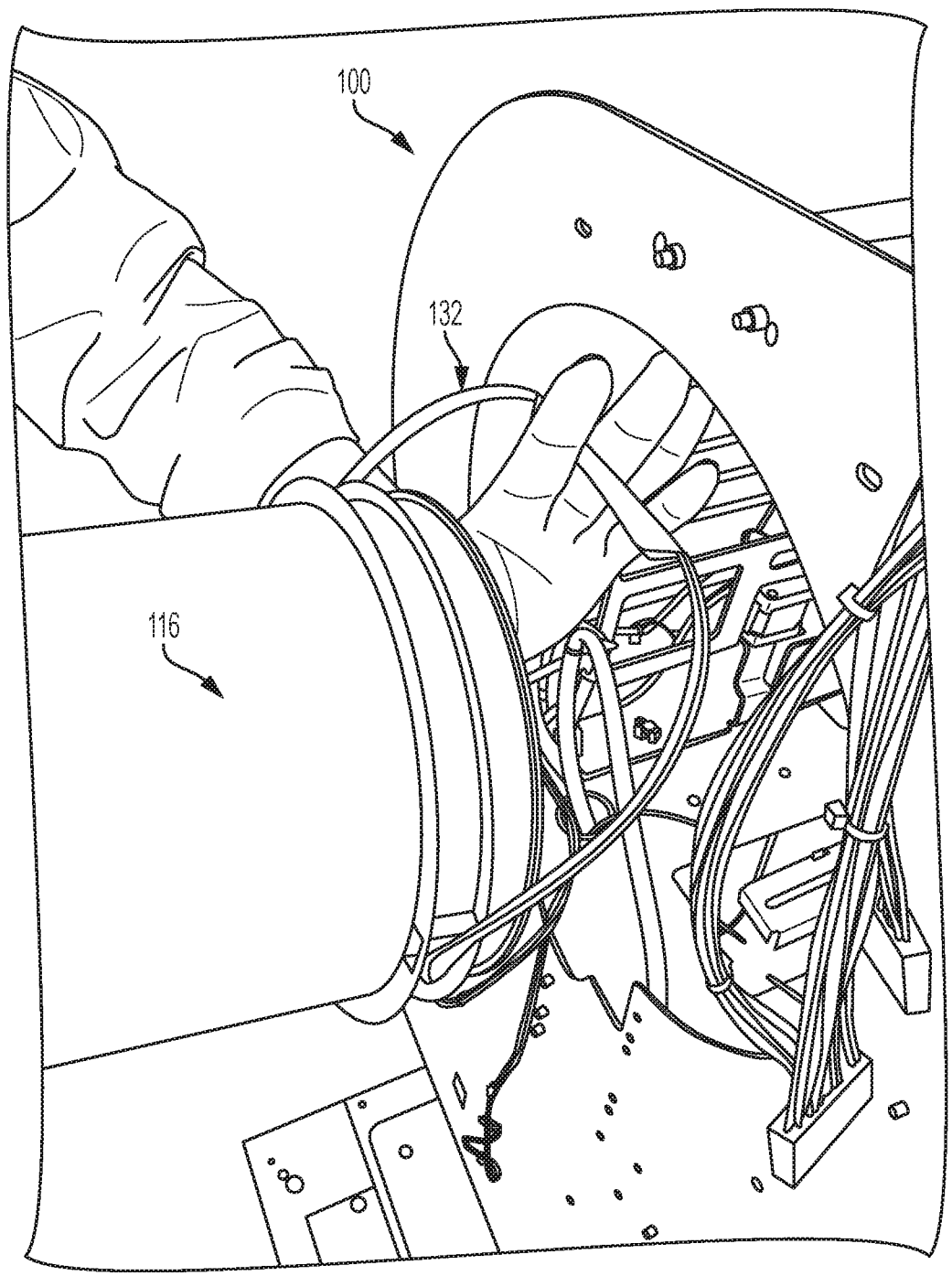
FIG. 18 is a side perspective view of a conical object used with an embodiment of a printer system disclosed herein wherein the conical object is being inserted through the printer system opening; and, FIG. 19 is front perspective view of an embodiment of a spindle with a bracket secured thereon which is used with an embodiment of a printer system disclosed herein.
Figure 19:
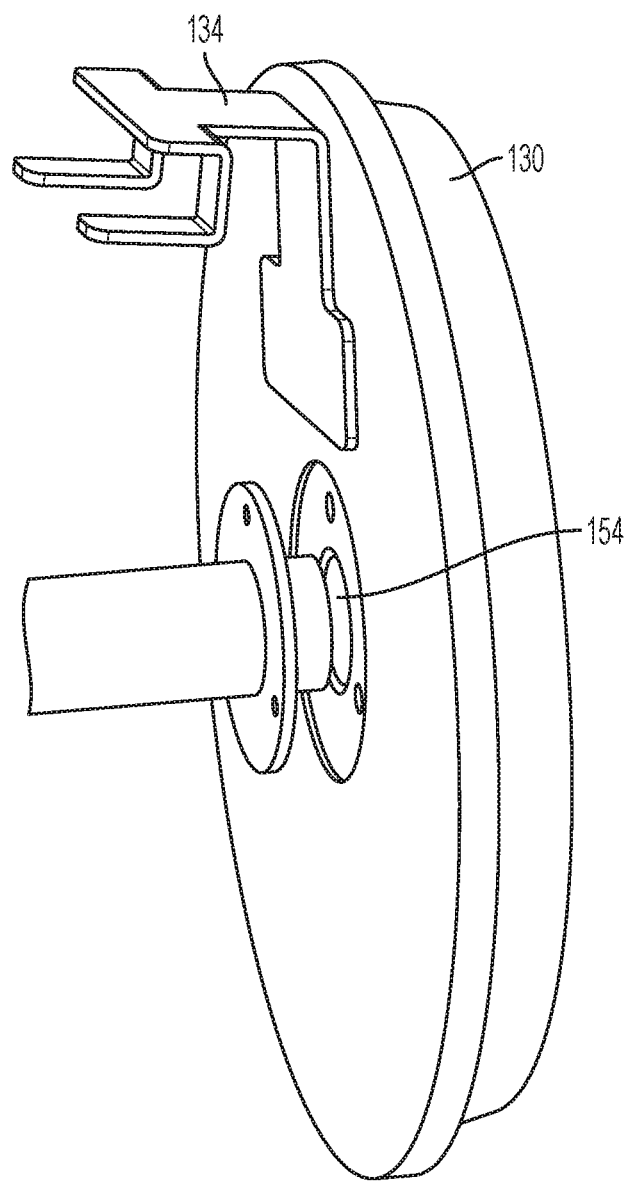

At the outset, it should be appreciated that like drawing numbers on different drawing views identify identical, or functionally similar, structural elements of the embodiments set forth herein. Furthermore, it is understood that these embodiments are not limited to the particular methodologies, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong. As used herein, "full width", e.g., "full width array sensor" and "full width printhead array", is intended to be broadly construed as any structure that covers a significant width of the substrate. For example, in some embodiments, the length of a full width array sensor is approximately half of the width of the substrate which it inspects.

Furthermore, the words "printer," "printer system", "printing system", "printer device" and "printing device" as used herein encompass any apparatus, such as a digital copier, bookmaking machine, facsimile machine, multi-function machine, etc. which performs a print outputting function for any purpose. Additionally, as used herein, "web", "substrate", "printable substrate" refer to, for example, paper, transparencies, parchment, film, fabric, plastic, photo-finishing papers or other coated or non-coated substrate media in the form of a web upon which information or markings can be visualized and/or reproduced, while a "thermoformable substrate" is intended to mean any substrate capable of being thermoformed after printing, i.e., capable of being shaped by the use of heat and pressure. As used herein, the term 'average' shall be construed broadly to include any calculation in which a result datum or decision is obtained based on a plurality of input data, which can include but is not limited to, weighted averages, yes or no decisions based on rolling inputs, etc.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Although any methods, devices or materials similar or equivalent to those described herein can be used in the practice or testing of these embodiments, some embodiments of methods, devices, and materials are now described.

The following explanation is a summary of the various concepts contained herein. The present system and apparatus 100 include housing 104, rod 106 arranged to be driven by first motor 108, object rotating subsystem 114, conical object 116, vacuum source 118, a plurality of printheads 120, e.g., printheads 122 and 124, curing lamp 126 positioned offset by ninety degrees from each printhead when viewed relative to object 116, and controller 128. Object rotating subsystem includes spindle 130 configured for reciprocal movement in the direction DR1 and DR2, second motor 110 operatively connected to spindle 130 to rotate spindle 130 when engaged with an object, e.g., conical object 116. It should be appreciated that spindle 130 rotates in a first rotational direction and a second rotational direction opposite the first rotational direction. For example, the first rotational direction may be clockwise rotation while the second rotational direction may be counter-clockwise rotation. Vacuum source 118 is operatively connected to spindle 130, and each of printheads 122 and 124 is operatively arranged to dispense a marking material onto object 116. Each of printheads 122 and 124 is connected with a third motor 123 and a fourth motor 125, respectively, which displace printheads 122 and 124 in a first direction DR1 and/or second direction DR2, respectively. Additionally, a protrusion sensor 150 is operatively arranged on print head carrier 152 and arranged to register a first location of protrusion 148.

Prior to operation, an object, e.g., cylindrical or conical bucket 116, is placed in close proximity to spindle 130. If the object includes additional components, e.g., handle 132, such components must be secured to prevent damage to or misprinting by system 100. For example, bracket 134 is included in the embodiments depicted in the figures. As bucket 116 is positioned proximate spindle 130, handle 132 is secured by bracket 134 thereby preventing movement of handle 132 during operation of system 100. Vacuum source 118, which is operatively connected to spindle 130, is activated and a negative pressure is created at opening 154 of spindle 130. The negative pressure engages conical object 116 and secures conical object 116 to spindle 130. Spindle 130 is actuated in first direction DR1 and second direction DR2 moving object 116 from outside housing 104 to inside housing 104.

A desired image, e.g., image 136, is processed via a system controller or other computer system into either a continuous helical image, or a series of step-wise portions of an image. When the desired image is a continuous helical image, the plurality of printheads traverse the length of conical object 116 in a continuous motion from one end of object 116 to the opposite end as object 116 rotates in apparatus 100. When the desired image is partitioned into a series of step-wise portions of the image, the plurality of printheads will traverse the length of object 116 in a series of step-wise motions proportional to the width of each partitioned image. Within that series of step-wise motions, the printheads will print in incremental steps, e.g., each step including a printed portion equivalent to substantially the length of the printhead plus and additional amount, such as 7 microns, introduced by a small movement of the printhead. It should be appreciated that relative movement between the object and the printheads may be introduced by at least one of the following means: linear movement of the spindle; and, linear movement of the printhead.

The plurality of printheads are arranged in a lateral direction, e.g., a direction orthogonal to the surface of the conical object, i.e., direction DR3. In some embodiments, system 100 comprises eight (8) printheads where each printhead is arranged to dispense a material, e.g., a marking material, a primer material, an over-coating material, etc., onto conical object 116. The materials dispensed from each printhead may be the same or different thereby permitting a variety of printed images, e.g., multi-color images, images including an overcoat layer, etc. Curing lamp 126 is beneath conical object 116, i.e., in direction DR4. In some embodiments, curing lamp 126 comprises a plurality of Ultra Violet (UV) Light Emitting Diodes (LEDs) arranged as linear array 138 and cylindrical lens 140 positioned to focus the emitted UV light into a line on object 116. During the printing process and as conical object 116, e.g., a bucket, rotates within apparatus 100, the intensity of light emitted from curing lamp 126 is increased as the number of rotations of conical object 116 increases to cure image 136 as the diameter of conical object 116 decreases. It should be appreciated that the printheads and curing lamp may be arranged in any orientation, although it is preferred to maintain the printheads and curing lamp orthogonally relative to each other. It should be further appreciated that other orientations are also possible provided that light emitting from the curing lamp does not project to the printheads, e.g., the printheads and curing lamp may be offset by one hundred twenty degrees (120°) relative to each other. The aforementioned orientation minimizes the amount of space used by the printheads and curing lamp and is used to prevent curing of dispensed materials within the printheads thereby extending the useful life of the printheads. Moreover, the curing lamp may also be positioned above the object, rather than below. Furthermore, the curing lamp may be placed adjacent a side elevational position of the object, as the orientation of the curing lamp relative to the printheads is controlled, i.e., illumination emitted by the curing lamp is prevented from reaching the printheads.

It should be further appreciated that curing lamp 126 may be used to pin or partially cure the printed image during each dispensing operation. Thus, in these embodiments, curing lamp 126 partially cures the printed image during each rotation and fully cures the printed image after completing the dispensing of material from the printheads. Moreover, curing lamp 126 may move relative to housing 104 or alternatively, object 116 may move relative to curing lamp 126. Still further, the printheads may be manually or automatically aligned relative to the orientation of the surfaces that receive the printed image. For example, the printheads may be oriented in an angular fashion to align with the frustoconical outer surface of a bucket. For automatic alignment, a least one proximity sensor and drive motor is necessary to detect the location of the surface and to move the printhead accordingly.

Emitted light feedback sensor 144 is operatively arranged on spindle carrier 146 for spindle 130 of apparatus 100 and is positioned in direction DR5 with respect to curing lamp 126. Emitted light feedback sensor 144 is arranged to measure an initial intensity and a final intensity of emitted light received from curing lamp 126, e.g., UV light. Thus, as spindle carrier 146 moves over curing lamp 126, in the direction DR2 when loading an object and in direction DR1 when dispensing the object after printing, sensor 144 obtains an initial intensity and a final intensity, respectively. If at any time during the printing process, the emitted light intensity measured at feedback sensor 144 drops below a predetermined threshold, e.g. an amount sufficient to ensure full curing of the printed material, the curing lamp controller triggers an alarm that indicates the printed material may not be fully cured, and apparatus 100 ceases operation until such time as curing lamp 126 can be fixed or replaced. A drop below the threshold, or a relative difference between the initial and final intensities, may also indicate burned out LEDs in array 138 contained in curing lamp 126.

In some embodiments, conical object 116 is a bucket or object including a handle or other moveable component, e.g., a lid. In these embodiments, printing system 100 further comprises bracket 134 fixedly secured on carrier 146 and operatively arranged to engage with handle 132 of bucket 116. As bucket 116 spins during the printing process, bracket 134 engages handle 132 and prevents it from freely pivoting within printing chamber 156 of housing 104.

In some embodiments, optical sensor 150 is provided for the express purpose of locating a protrusion, e.g., protrusion 148, on the external surface of conical object 116. Protrusion 148 establishes an orientation of object 116 such that in some circumstances it is desirable to align the printed image with respect to protrusion 148. Thus, the printed image may be aligned with what is considered the "front" of object 116. For example, if conical object 116 is a five (5) gallon bucket, it is desirable to orient the image on the external surface of the bucket with respect to the position of the bucket handle. The printing process begins by spinning bucket 116 about a longitudinal axis through the partial through-bore of the bucket in a first rotational direction. While bucket 116 spins, optical sensor 150 locates one of the two protrusions 148 within which bucket handle 132 is secured. Once optical sensor 150 locates one of protrusions 148, the bucket's orientation or "front" surface is known and the orientation of the image can then be properly established. In an example, after detection of the protrusion, rotation is stopped, and then bucket 116 is rotated in a second direction approximately 45 degrees so that when the printing process begins the image is properly oriented with respect to handle 132 of bucket 116. It should be appreciated that although sensor 150 is described as an optical sensor, other types of sensors may also be used, e.g., high frequency proximity sensors, ultrasonic sensors, contact sensor, etc.

The reader should appreciate that although the aforementioned embodiments are described in the context of printing UV curable inks, other materials may also be printed, e.g., waxes and solid inks. In those embodiments, a different curing lamp or no curing lamp may be needed. Moreover, the present system is fully configurable in that any form of print recipe can be performed. For example, a recipe may include the initial deposit of a primer layer followed by a subsequent deposit of an image and further followed by a final deposit of an overcoat layer. Still further, the present system can accommodate irregularly shaped surfaces, e.g., a surface including a protrusion. In some embodiments, the printheads included in the present system can print on protrusions extending up to seven (7) millimeters from the surface. Thus, the present system does not need to alter the distance between the printheads and the surface.

Figure 20:
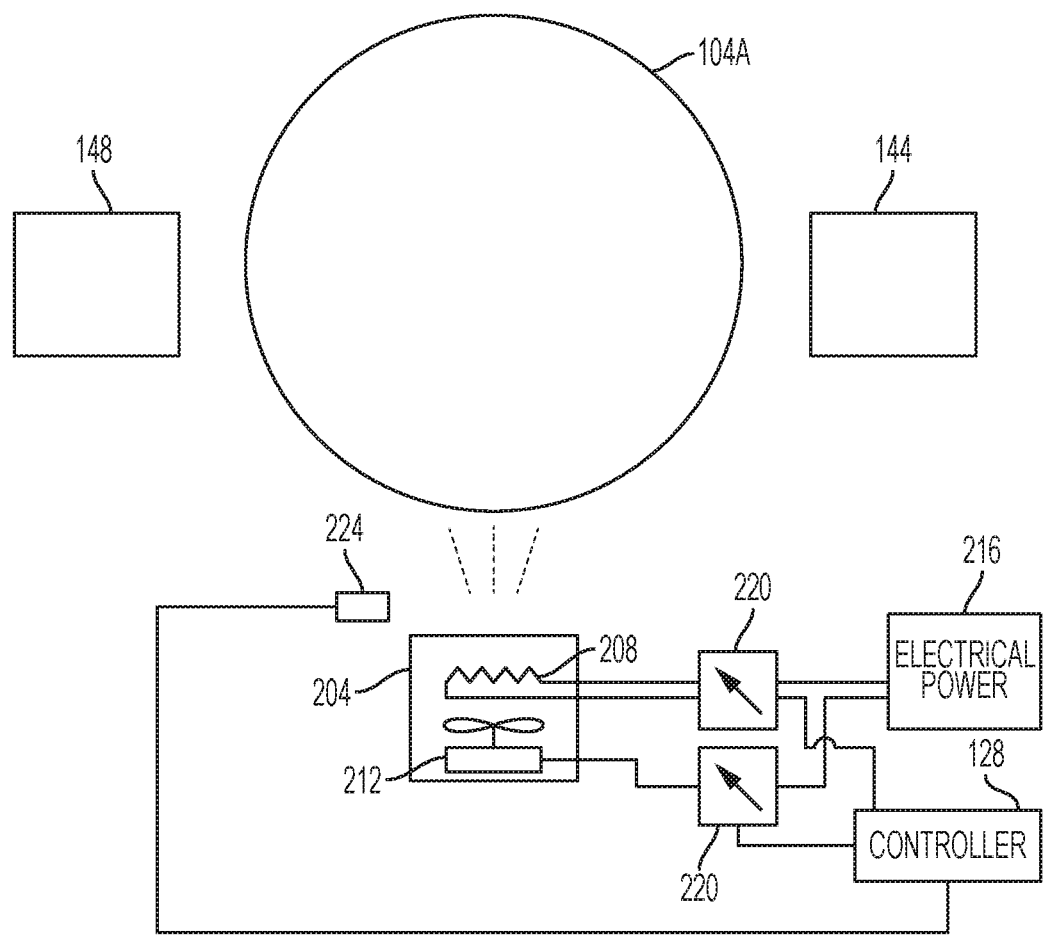
FIG. 20 is a block diagram of an embodiment of a printer that forms ink images on fibrous objects with solid ink drops and affixes the image to the objects with heated air.

In another embodiment shown in FIG. 20, the printer is configured to formed ink images on objects 116 made with fibrous material, such as paper, using solid ink. The print heads 122 and 124 shown in printer 200 of FIG. 20 are configured for use with solid ink and are supplied with melted solid ink in a known manner and operated in a known manner to eject drops of the melted ink onto the surface of the object 116 to form an ink image on the object. In order for the solid ink to affix to the surface of the fibrous object 116, controller 128 operates a forced air heater 204 to direct heated air towards the surface of the fibrous object 116. This heating begins when the object enters the chamber 156 and continues until the object is removed from the chamber 156. The forced air heater can include a heating element 208 and a positive air source 212, such as a fan, that is configured to direct air through or over the heating element to heat air before the air is directed to the surface of the object 116. The controller 128 is operatively connected to variable switches 220 to regulate the amount of electrical power provided from power source 216 to the heating element 208 and the positive air source 212. The operation of the two variable switches is independent of one another. In this manner, the controller can regulate the temperature of the forced air and the speed of the air flow from the forced air source 204. Additionally, a temperature sensor 224 is operatively connected to the controller 128. The temperature sensor 224 generates a signal indicative of the temperature of the surface of the object 116 and the controller 128 is configured to control the power supplied to the forced air source 212 and the heating element 208 using the signal from the sensor 224. In one embodiment, the air directed toward the object 116 has a temperature in a range of about 230° F. to about 270° F.

The embodiment 200 is useful for printing paper cups, such as those used in coffee shops, fast food establishments, or the like, to enable the cups to be printed prior to a beverage or hot food stuff being placed in the cup. Solid ink has an advantage in that it has been approved for use on food packaging and other materials that may come in contact with food for human consumption. Preheating the cup surface enables the melted solid ink ejected onto the surface sink into the object surface and be absorbed by the fibers in the object material. This process continues until the cup is removed from the printer and the cooling of the melted ink solidifies the ink within the object surface. This heat processing alone sufficiently affixes the image to the object that ink rub off is not observed until the contents of the cup exceeds 300° F., which is well above a safe temperature of food stuffs for human consumption. Thus, a printer such as embodiment 200 can be provided at a food service location to enable blank cups or cups pre-printed with a business' logo to be custom printed with the customers name, order, mixture ingredients, or the like as the customer's order is being prepared.

The present disclosure sets forth an apparatus for printing onto buckets and other large round conical or frustoconcial containers. A bucket or other object is held onto a mandrel or spindle with a vacuum and is spun along its axis. At least one or more printheads, e.g., one inboard and one outboard facing towards each other on opposite sides of the bucket, print up to 4 colors each. A curing lamp is positioned below the bucket and may act to pin and/or cure the ink after one printhead dispenses prior to the next printhead dispensing. Printheads can index in the axial direction to gain effective print resolution. The mandrel or spindle can index in the axial location to print larger images. This arrangement allows for printing on containers with a large rim such as a typical plastic bucket and does so without interference of a shuttling printhead. A benefit of the present system includes decreased run cost and increased throughput versus offset printing or pre-printed and then applied labels. The present system enables improved capability over other rotary direct to object printers in printing large-rimmed containers.

The present disclosure sets forth an apparatus for printing onto buckets and other large round conical or frustoconcial containers. A bucket or other object is held onto a mandrel or spindle with a vacuum and is spun along its axis. At least one or more printheads, e.g., one inboard and one outboard facing towards each other on opposite sides of the bucket, print up to 4 colors each. A curing lamp is positioned below the bucket and may act to pin and/or cure the ink after one printhead dispenses prior to the next printhead dispensing. Printheads can index in the axial direction to gain effective print resolution. The mandrel or spindle can index in the axial location to print larger images. This arrangement allows for printing on containers with a large rim such as a typical plastic bucket and does so without interference of a shuttling printhead. A benefit of the present system includes decreased run cost and increased throughput versus offset printing or pre-printed and then applied labels. The present system enables improved capability over other rotary direct to object printers in printing large-rimmed containers. Additionally, a printing system useful for custom printing fibrous containers at retail locations has been disclosed.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for printing images on an object, the system comprising:
   a housing;
   a rod driven by a first motor;
   an object rotating subsystem positioned about the rod and arranged for reciprocal movement, the object rotating subsystem comprising:
      a spindle; and,
      a second motor operatively connected to the spindle, the second motor being configured to rotate the object in a first rotational direction and/or a second rotational direction;
   a vacuum source operatively connected to the spindle;
   a plurality of printheads configured to eject solid ink drops;
   a forced air heater having a heating element and a positive air source;
   a temperature sensor, the temperature sensor being configured to generate a signal indicative of a temperature of the surface of the object; and,
   an electrical power source;
   a first variable switch operatively connected between the electrical power source and the heating element;
   a second variable switch operatively connected between the electrical power source and the positive air source;
   a controller operatively connected to the plurality of printheads, the first motor, the second motor, the temperature sensor, and the forced air heater, the controller being configured to operate the first motor to move the object rotating subsystem to and from a position opposite the plurality of printheads, to operate the second motor to rotate an object on the spindle at the position opposite the plurality of printheads, to operate the forced air heater to direct heated air onto the surface of the object as the object rotates at the position opposite the plurality of printheads and to operate the first variable switch and the second variable switch using the signal generated by the temperature sensor to regulate the operation of the forced air heater, and to operate the plurality of printheads to eject a first marking material onto the heated surface of the object as the object rotates in the first and/or second rotational direction.

2. The system of claim 1, the controller being further configured to operate the first variable switch and the second variable switch independently of one another.

3. The system of claim 2, the controller being further configured to operate the first variable switch to maintain the air directed toward the surface of the object to be within a range of about 230° F. to about 270° F.

4. The system of claim 1 wherein the first motor is further configured to rotate the rod in a first rotational direction and a second rotational direction to displace the object rotating subsystem in a first lateral direction and a second lateral direction, respectively, wherein the first lateral direction and the second lateral direction are substantially parallel with the rod.

5. The system of claim 1 further comprising:
   a bracket, fixedly secured to the spindle and operatively arranged to engage a moveable component of the object.

6. The system of claim 5 wherein the moveable component is a handle.

7. The system of claim 1 wherein the plurality of printheads are positioned at a first distance relative to the surface of the object in a third lateral direction, where the third lateral direction is substantially orthogonal to the surface of the object.

8. A system for printing images on an object, the system comprising:
   a housing;
   a rod driven by a first motor;
   an object rotating subsystem positioned about the rod and arranged for reciprocal movement, the object rotating subsystem comprising:
      a spindle; and,
      a second motor operatively connected to the spindle and configured to rotate the object in a first rotational direction and/or a second rotational direction;
   a vacuum source operatively connected to the spindle;
   a plurality of printheads configured to eject solid ink drops;
   a forced air heater;
   an optical sensor, fixedly secured to the plurality of printheads or the spindle, the optical sensor operatively arranged to register a location of a first protrusion on a surface of the object; and,
   a controller operatively connected to the plurality of printheads, the first motor, the second motor, and the forced air heater, the controller being configured to operate the first motor to move the object rotating subsystem to and from a position opposite the plurality of printheads, to operate the second motor to rotate an object on the spindle at the position opposite the plurality of printheads, to operate the forced air heater to direct heated air onto the surface of the object as the object rotates at the position opposite the plurality of printheads, and to operate the plurality of printheads to eject a first marking material onto the heated surface of the object as the object rotates in the first and/or second rotational direction.

9. The system of claim 8 wherein the plurality of printheads are connected to a third motor, the third motor operatively arranged to displace the printheads in a first lateral direction and a second lateral direction, where the first and second lateral directions are substantially parallel to the rod.

10. The system of claim 9 wherein the third motor is operatively arranged to displace the plurality of printheads in the first and/or second lateral directions in step-wise movements that begin at the registered location of the first protrusion.

11. A method for operating a printing system to form ink images on an object comprising:
   operating with a controller a first motor to move an object rotating subsystem to and from a position opposite a plurality of printheads;
   operating with the controller a second motor to rotate a spindle of the object rotating subsystem to rotate an object mounted on the spindle at the position opposite the plurality of printheads;
   operating with the controller a forced air heater to direct heated air onto a surface of the object as the object rotates at the position opposite the plurality of printheads;
   regulating with the controller operation of the forced air heater by using a signal indicative of a temperature of the surface of the object that is generated by a temperature sensor to operate a first variable switch and a second variable switch to vary an amount of electrical power provided by an electrical power source to a heating element of the forced air heater and a positive air source of the forced air heater using the signal generated by the temperature sensor; and operate with the controller the plurality of printheads to eject drops of a first marking material onto the heated surface of the object as the object rotates in the first and/or second rotational direction.

12. The method of claim 11 wherein the drops of the first marking material ejected by the operation of the plurality of the printheads are solid ink drops.

13. The method of claim 11 wherein the operation of the first variable switch is independent of the operation of the second variable switch.

14. The method of claim 13 wherein the operation of the first variable switch maintains the air directed toward the surface of the object to be within a range of about 230° F. to about 270° F.

* * * * *